United States Patent
Yu et al.

(10) Patent No.: US 7,463,701 B2
(45) Date of Patent: Dec. 9, 2008

(54) FAST SYMBOL TIMING RECOVERY FOR TRANSMITTED DIGITAL DATA

(75) Inventors: Yanbin Yu, Fremont, CA (US); Qingyi Zheng, Newark, CA (US)

(73) Assignee: UTStarcom, Inc., Alameda, CA (US)

( * ) Notice: Subject to any disclaimer, the term of this patent is extended or adjusted under 35 U.S.C. 154(b) by 798 days.

(21) Appl. No.: 10/712,842

(22) Filed: Nov. 12, 2003

(65) Prior Publication Data

US 2004/0136478 A1 Jul. 15, 2004

Related U.S. Application Data

(60) Provisional application No. 60/425,781, filed on Nov. 12, 2002.

(51) Int. Cl.
*H03D 3/22* (2006.01)
*H04L 27/22* (2006.01)

(52) U.S. Cl. .................. 375/329; 375/326; 375/355; 375/365

(58) Field of Classification Search ............... 375/329, 375/326, 355, 365, 372
See application file for complete search history.

(56) References Cited

U.S. PATENT DOCUMENTS 5,809,009 A * 9/1998 Matsuoka et al. ........... 370/206
6,618,352 B1 * 9/2003 Shirakata et al. ........... 370/203

* cited by examiner

*Primary Examiner*—Ted Wang

(57) ABSTRACT

A system and method of recovering symbol timing from a high symbol rate TDD or TDMA broadband transmission. A correlator operating at a fraction of the symbol rate receives in-phase and quadrature data signals from a broadband demodulator and processes those signals using a predefined match filter for a pilot signal to detect the pilot signal. The correlator measures any timing error in the symbol timing and adjusts a pointer in a memory buffer to replay the pilot signal to the correlator. Again, any timing error is determined and the pointer in the memory buffer is adjusted for a final replay of the pilot signal as well as the data to the correlator. At this point the timing error in the symbol timing is reduced to a minimum. With symbol timing established, coefficients in an equalizer are adjusted so that the remaining data transmission is properly received.

7 Claims, 7 Drawing Sheets

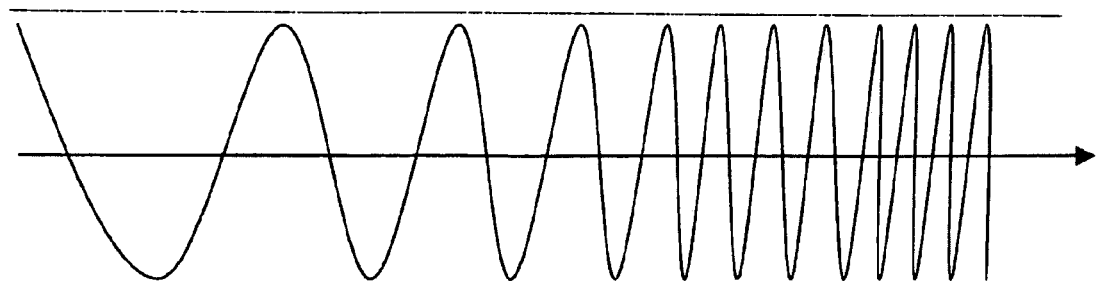
FIG. 6a
| Polarity | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 1 | 1 | 1 | 0 | 0 | 0 | 1 | 1 | 0 | 1 | 0 | 1 | 0 | 1 | 0 |
| 1 | 0 | 0 | 0 | 0 | 1 | 1 | 1 | 0 | 0 | 1 | 0 | 1 | 0 | 1 | 0 | 1 |
FIG. 6b
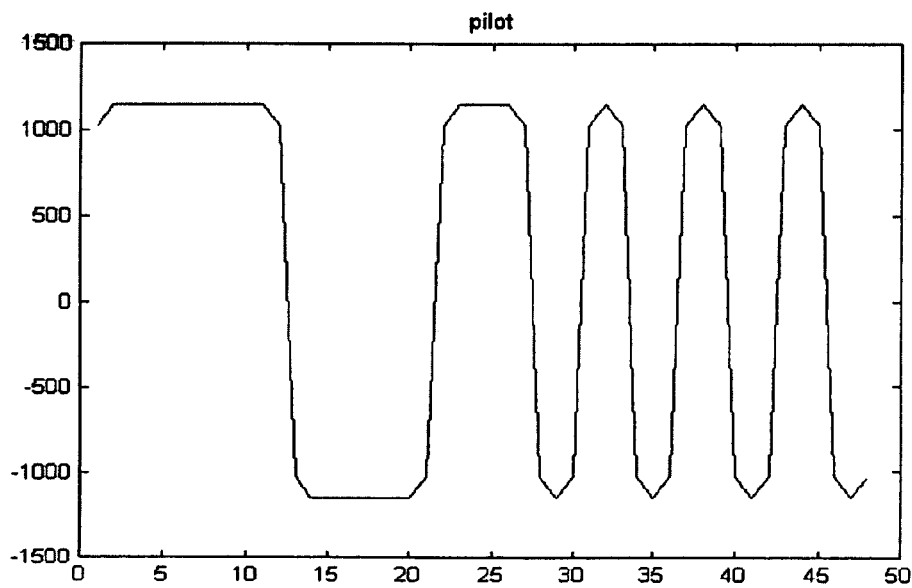
FIG. 6c

| Polarity | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 0 | 1 | 0 | 1 | 0 | 1 | 1 | 0 | 0 | 0 | 1 | 1 | 1 | 1 |
| 1 | 1 | 0 | 1 | 0 | 1 | 0 | 1 | 0 | 0 | 1 | 1 | 1 | 0 | 0 | 0 | 0 |

FAST SYMBOL TIMING RECOVERY FOR TRANSMITTED DIGITAL DATA

CROSS-REFERENCE TO RELATED APPLICATIONS

This application claims priority of Provisional Application Ser. No. 60/425,781 of the same title filed on Nov. 12, 2002.

FIELD OF THE INVENTION

This invention relates generally to receiver synchronization upon receipt of a broadband transmission, and more particularly, to symbol synchronization at the receiver upon receipt of a broadband transmission having a high bit rate.

DESCRIPTION OF THE RELATED ART

A Time-Division Duplex (TDD) or Time Division Multiple Access (TDMA) transmission system is one which sends and receives information, for example in the form of packets, at different times. Such a TDD or TDMA system requires that symbol timing be accurately recovered for each packet, especially at the beginning of the packet where typically a syncword and header are stored. Such a circumstance is encountered in a twisted-pair broadband connection, such as digital subscriber loop, between customer premises equipment (CPE) and a central office (CO). If the CPE and CO modems have a different digital oscillators for their clock signals and no constant and reliable clock signals are interchanged, a difference in their digital oscillators of 50 PPM (0.005%) over a transmission receiving period of 2000 us, causes a maximum timing difference of 0.1 us. If the symbol rate in the transmission system is 7 million baud, the symbol period is 0.143 us. Therefore, such a timing difference (about 70%) would create a huge error in the first part of a received packet. At the very least the sync word of the packet would be lost.

In TDD or TDMA systems, there are several ways to achieve symbol timing recovery. One is a line-locked clock found in the signals. This requires a pre-equalization signal which can be greatly distorted due to line conditions such as a tap-bridge or cross-talk. The pilot signal in a packet would be vulnerable to loss. Normally, a phase lock loop (PLL) must be implemented in such systems.

Alternatively, the symbol's timing can be recovered by re-training a receiver equalizer each time a packet is received and the symbol timing can be derived from the signals after equalization because the post-equalization signals would have very little distortion. This scheme only applies to low bit rate situations where the DSP and equalization functions can be implemented by using software/firmware means and data can be re-processed.

Yet other alternatives are that a very long pilot can be used, resulting in very high overhead or a receiver equalizer with relatively few taps can be used making it faster to retrain while sacrificing the quality of the equalizer function.

However, the above solutions are unacceptable for a digital subscriber loop (DSL) which has a high symbol rate and a high bit rate. The solutions based on software/firmware only are simply not viable.

Therefore, there is a need, in a high symbol rate time domain (TD) system, for the fast recovery of symbol timing at the receiver.

BRIEF SUMMARY OF THE INVENTION

The present invention provides for fast recovery of symbol timing at the receiver without excessive pilot length or equalizer retraining. A method, in accordance with the present invention, allows for rapidly recovering symbol synchronization for a serial transmission. The method includes the steps of (i) obtaining in-phase and quadrature components of a received digital bitstream, where the components include a pilot bitstream that is embedded in the received components; (ii) storing a copy of the obtained in-phase and quadrature components; (iii) recovering a version of the pilot bitstream from the obtained components; (iv) computing a timing correction factor based on the recovered pilot bitstream; (v) if the timing correction factor is non-zero, applying the timing correction factor to the stored copy of the received components to adjust the symbol timing of the received bitstream; and (vi) recovering another version of the pilot bitstream from the copy of the received bitstreams based on the adjusted symbol timing.

The present invention quickly accomplishes symbol timing recovery because the timing correction factor becomes a small number with only a few iterations of the above method.

A high speed TD system becomes feasible when the present invention is employed because symbol timing recovery, which is required on each new reception, is fast.

Further, implementation of the present invention can be carried out using existing digital signal processing techniques such as filters, equalizers, and memory.

BRIEF DESCRIPTION OF THE DRAWINGS

These and other features, aspects and advantages of the present invention will become better understood with regard to the following description, appended claims, and accompanying drawings where:

FIG. 6a shows the waveshape of the signal bits for the pilot, P;

FIG. 6b is a table of the modified BARC code which comprises the pilot waveform;

FIG. 6c is the plotted pilot waveform resulting from programming the code into the registers;

DETAILED DESCRIPTION OF THE INVENTION

Figure 1:
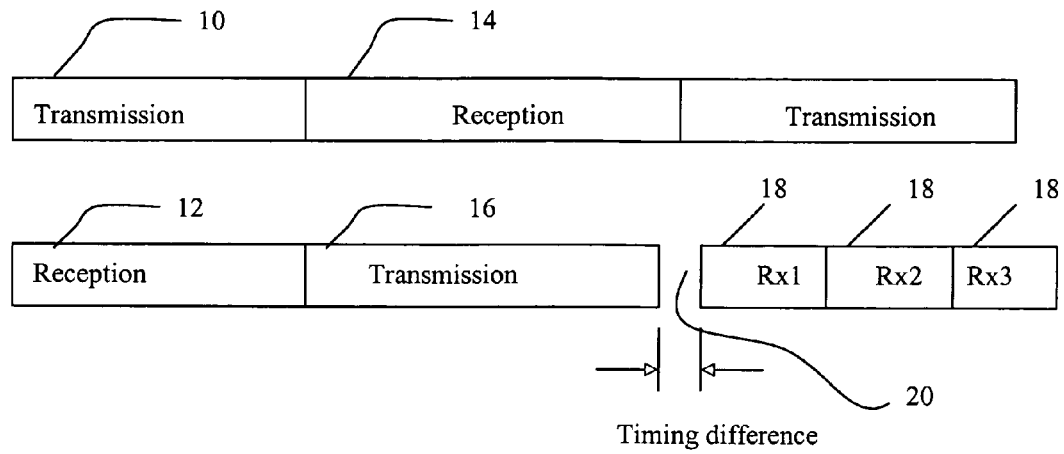
FIG. 1 shows the transmissions in a TD system.

FIG. 1 shows exemplary transmissions in a TD system for the CO and CPE elements. As shown, each element times transmission and reception periods substantially opposite to the corresponding element. During the transmission period for a first element in block 10, the other element is in a receive period in block 12. The first element then has a receive period, block 14 corresponding to the other element's transmit period in block 16. Exemplary division of the periods for multiplexing is shown with the RX1, RX2, etc. division of the receive period in block 18. The difference in timing which may be present between the two elements is demonstrated by offset 20

Figure 2:
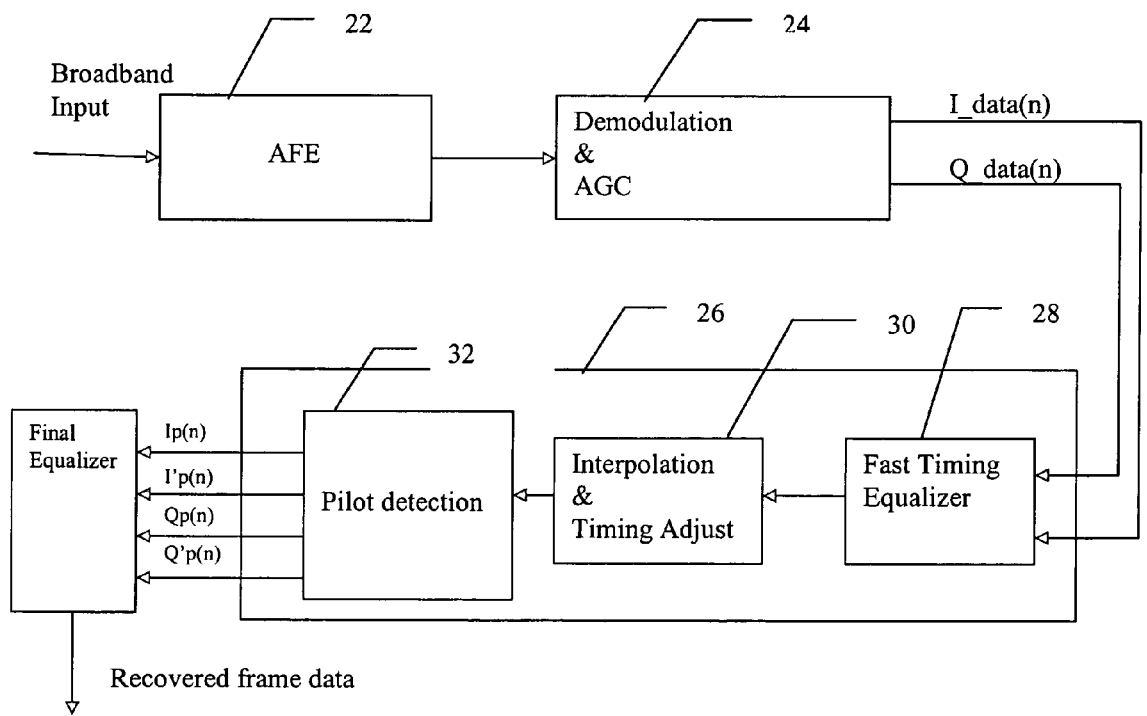
FIG. 2 shows a block diagram of the fast recovery system.

FIG. 2 shows a block diagram of the fast recovery system. Included are an Analog Front End (AFE) 22, a Demodulator with automatic gain control (AGC) 24 and the timing recovery element 26 which includes the functions of a Fast Timing Equalizer 28, an M-to-N Interpolation and Timing Adjustment Block 30, and a pilot detection block 32. The Demodulator operates on the modulated QAM broadband signal to produce the in-phase and quadrature components of the QAM signal. The fast timing equalizer is designed, in conjunction with the Final Equalizer, to minimize intersymbol interference (ISI) introduced by the transmitter and channel frequency characteristics. The 8 to 3 Interpolator down converts the timing from Ts/8 to Ts/3, where Ts is the symbol rate. The pilot signal and detection block are designed to accurately and quickly recover symbol timing for the received data, and is more fully described below.

Figure 3:
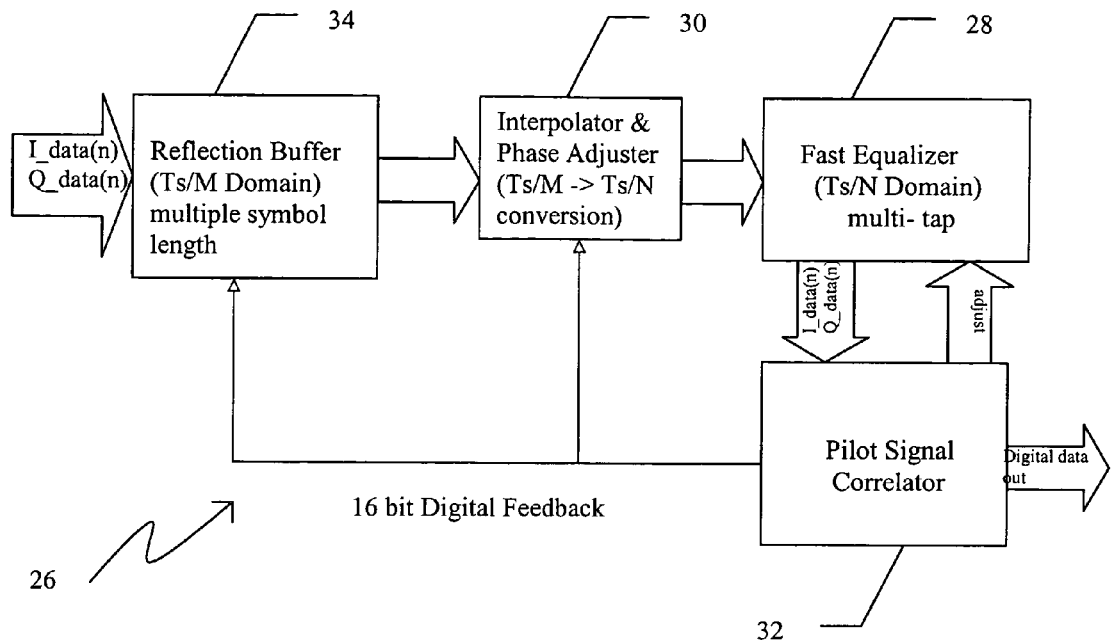
FIG. 3 shows a more detailed diagram of the Fast Timing Equalizer, the Synchronization Block and the 8 to 3 interpolation blocks.

FIG. 3 shows a more detailed diagram of the timing recovery element demonstrating the interrelationship of the Fast Timing Equalizer, Pilot Signal Correlator which acts as the pilot detector and the 8 to 3 Interpolation blocks which adjusts the timing. Also included is a reflection buffer 34 which stores incoming data to provide to the interpolator, fast equalizer, and pilot correlator. Data is received by the reflection buffer at Ts/8 (8×Fs) and then fed to the interpolator/phase adjuster acting as a down sampler which changes the rate to Ts/3 (3×Fs). The data is then fed to the fast equalizer and then to a pilot correlator. The interpolator, the equalizer and the reflection buffer each received feedback from the pilot correlator.

The interpolator is used to perform phase adjustment. The fast equalizer after the interpolator reduces the channel distortion to improve the pilot correlation and detection function and to help the final data detection in the final equalizer. The total equalization in the system is the concatenation of the fast equalizer and the final equalizer. The fast equalizer has 24 (or less) taps and is controlled and trained by the pilot correlator.

The pilot correlator is designed to find the pilot with great precision such that the incoming pilot can be better-received by the main equalizer and subsequent modules, as will be described in greater detail subsequently.

Figure 4:
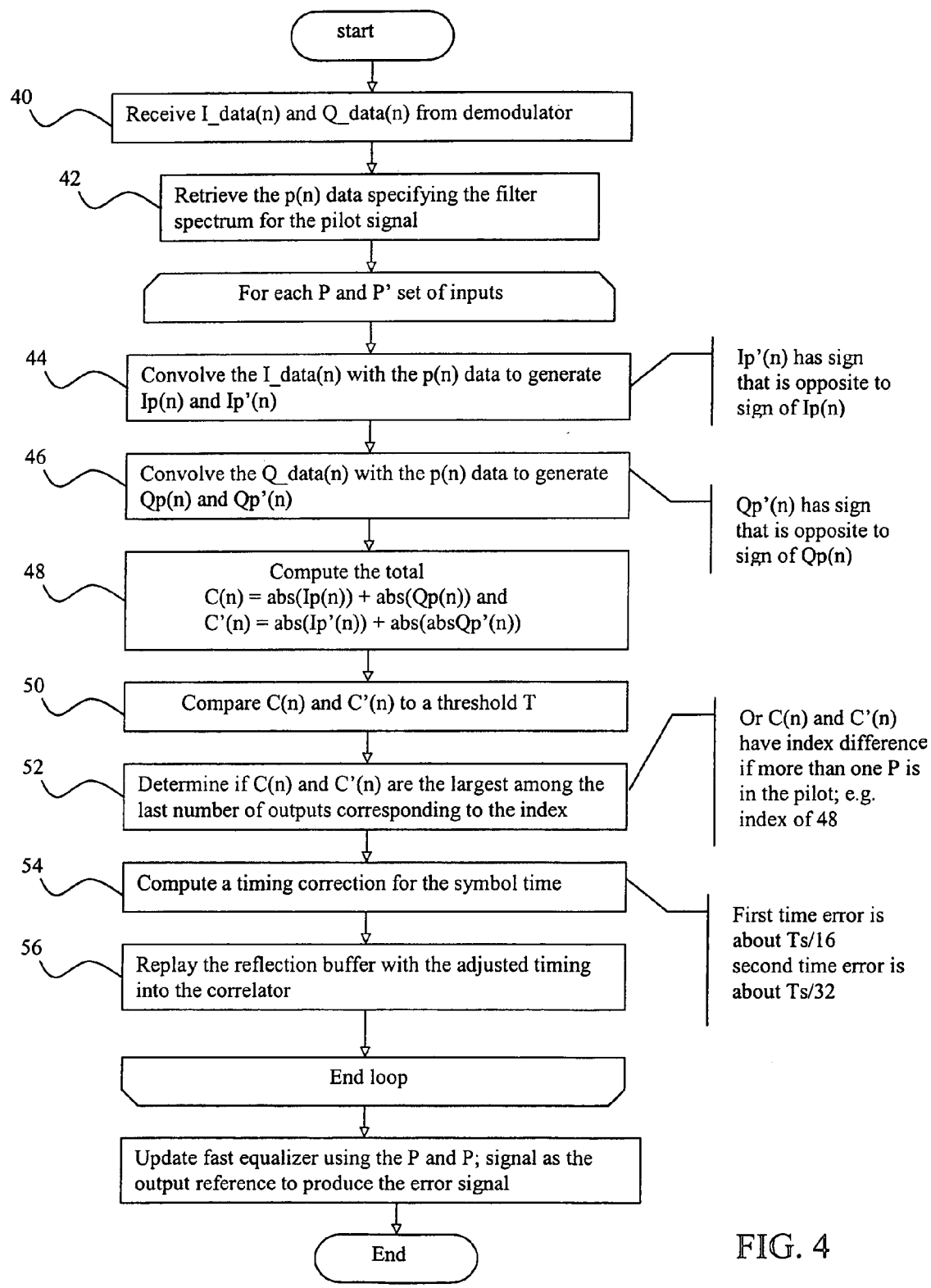
FIG. 4 shows a flow chart of the symbol timing recovery procedure.

Referring to FIG. 4, in step 40, I_data(n), Q_data(n), are received from the I and Q demodulators, respectively, in the demodulation block of FIG. 1. The demodulation block receives the broadband DSL Differential Phase-Shift Keying (DPSK) pilot signal and Quadrature Amplitude Modulated (QAM) signal containing the symbol stream to be recovered. Next, in step 42, the sampled p(n) data for the pilot signal is retrieved from storage. The p(n) data has a baseband spectrum that matches the expected spectrum of the pilot input signal. The I_data(n), Q_data(n) and p(n) data are then sent to the pilot correlator, which is a match filter designed to maximize the output signal over the rms noise level. If the noise is white noise, then convolving the input with the spectrum of the expected input, e.g., p(n), generates this result. In steps 44 and 46, the I_data(n) and Q_data(n) are convolved (Eq. 1 and 2) with the sampled version of the predefined pilot signal p(n), whose characteristics are described in detail below.

$$Ip(n)=\Sigma p(i)*I\_data(n-i) \quad (1)$$

$$Qp(n)=\Sigma p(i)*Q\_data(n-i) \quad (2)$$

$$I'p(n)=\Sigma p'(i)*I\_data(n-i) \quad (3)$$

$$Q'p(n)=\Sigma p'(i)*Q\_data(n-i) \quad (4)$$

The outputs of pilot correlator, Ip(n), Qp(n), I'p(n), Q'p(n) are combined according to equations 5 and 6, in step 48, after taking the absolute value of each output, $$C(n)=abs(Ip(n))+abs(Qp(n)) \quad (5)$$

$$C'(n)=abs(I'p(n))+abs(Q'p(n)) \quad (6)$$

and each sum C(n), C'(n) is compared, in step 50, to a predefined threshold T. If the output C(n) is greater than the threshold T and is the largest of the last 48 outputs, as defined in step 52, then the pilot signal P is considered detected. Alternatively, if there is more than one pilot signal P in the input bit stream, then if the last event detected is greater than the predefined threshold and the largest of the last 48 outputs, P is considered detected.

Detection of P' is slightly different from detection of P. Equations 3 and 4 must be met, but the sign of Ip'(n) and Qp'(n) for P' must be opposite to the sign of Ip(n) and Qp(n) for P. Alternatively, if {Ip(n), Qp(n)} is orthogonal to {Ip'(n), Qp'(n)}, then P' is considered detected.

Once P and P' are detected, a timing correction is calculated, in step 54, $$\Delta = \frac{C(i-1) - C(i+1)}{(C(i)/8)}, \quad (7)$$

where C(n) is the output of the pilot correlator and n is the index for maximal output. If the symbol timing is correct, C(i) is a maximum and C(i−1) and C(i+1) are equal because they are symmetric about the maximum. Otherwise, equation 7 computes a correction to the symbol timing, either positive or negative, which is used in a loop to reduce the symbol timing error. In this loop, a first set of P and P' inputs and two sets of saved P and P' inputs from the reflection buffer are sent to the pilot correlator in step 56 and a timing correction is calculated. If the symbol period is 143 nanoseconds (ns), the timing error has been reduced to approximately Ts/16 (about 9 ns or 6%) after the second iteration of the loop, and to approximately Ts/32 (about 4.4 ns or 3%) after the third iteration of the group. In each iteration of the loop the timing adjustment is used to offset the pointer in the reflection buffer by an amount equal to Δ.

Figure 5:
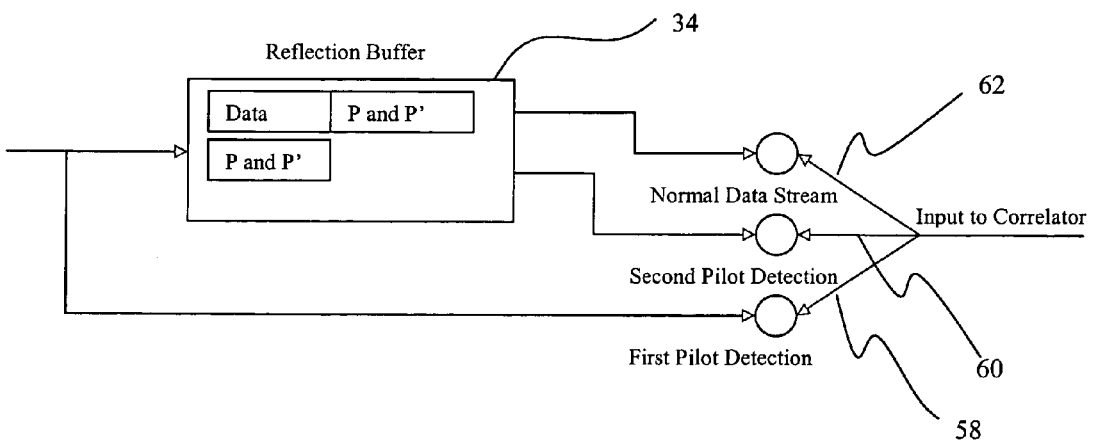
FIG. 5 shows a diagram of the conceptual operation of the reflection buffer.

FIG. 5 shows a diagram of the conceptual operation of the reflection buffer. In the first pilot detection position 58, the input to the correlator is derived from the demodulated data stream. In the second detection position 60, the pointer is reset and the pilot is again input to the correlator from the reflection buffer. In the third detection position 62, the pointer is again reset and the pilot and data input to the correlator is derived from the reflection buffer. The pointer to the data in the reflection buffer is altered based on the timing error computed above.

Figure 6D:
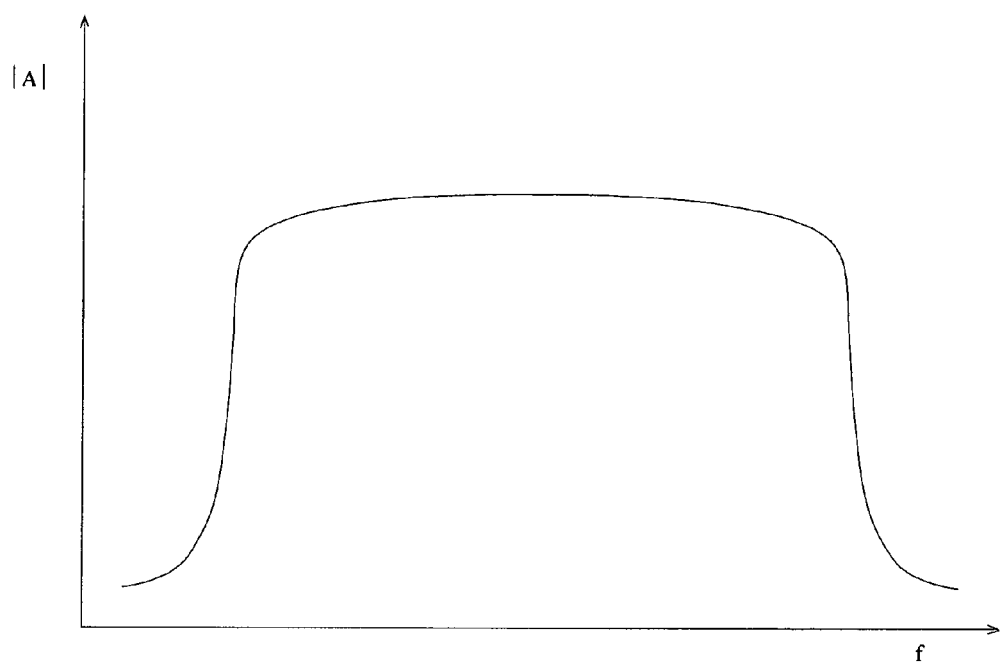
FIG. 6d shows the spectrum of the waveshape of the pilot signal bits.

FIG. 6a is an example of the pilot waveform. The pilot shown has all the frequency components and cannot be corrupted totally by the channel. For the embodiment shown, the pilot is 16 symbols in length having broad spectrum coverage and high AC energy. The pilot is implemented using the QAM cosine filter. The generated I and Q signals have opposite polarity which enhances the detection operation. The pilot is a Modified BARC code with the patterns shown in FIG. 6b. The pilot code can be programmable by writing to the registers of the system. FIG. 6c is a plot of the resulting pilot waveform. FIG. 6d shows a spectrum of the pilot signal. A discrete version of this spectrum is used by the pilot correlator to help recover the correct symbol timing.

Figure 6E:
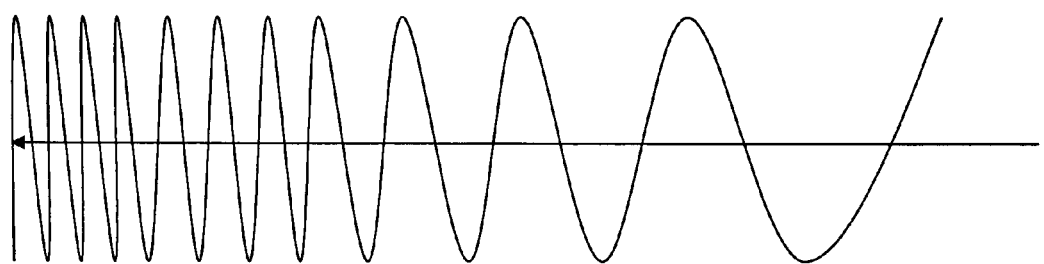
FIG. 6e shows the waveshape of the signal bits for the mirrored pilot, P'.
Figures 6F, 6G:
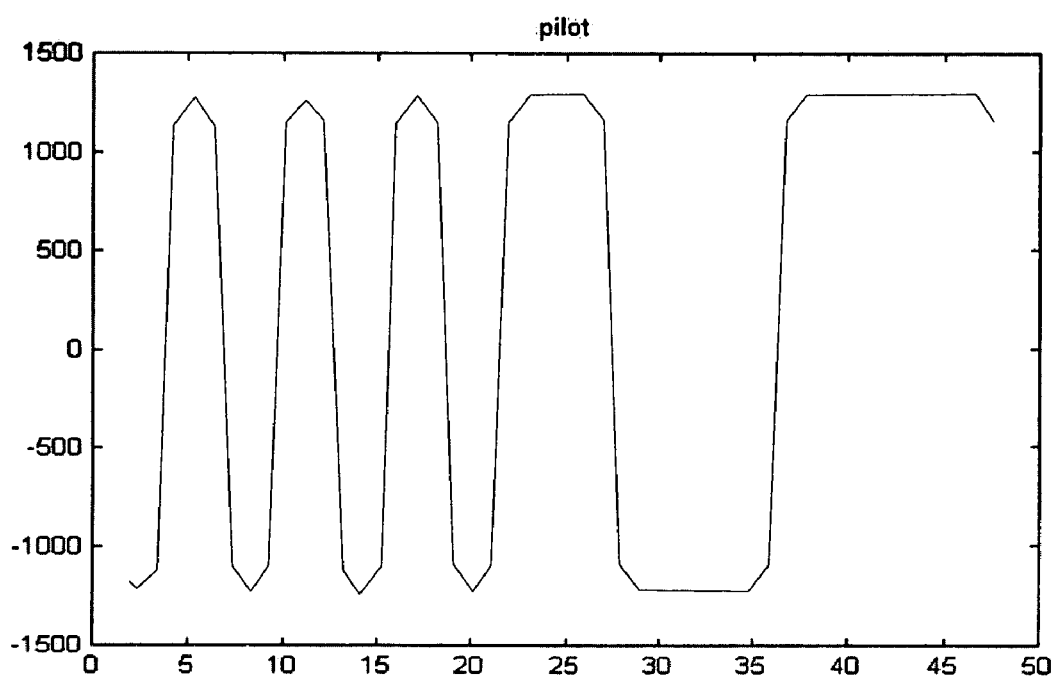
FIG. 6f is a table of the modified BARC code which comprises the P' waveform.
FIG. 6g is the plotted pilot waveform resulting from programming the code into the registers for the P' waveform.

For the embodiments shown, P' is a mirror image of P as shown in FIG. 6e. Again a modified BARC code with the patterns shown in FIG. 6f is employed to create the code for P' while FIG. 6g shows the resulting waveform.

After the pilot signal has been reliably detected, the pilot correlator becomes a phase adjuster, i.e., an all pass filter with pre-calculated coefficients, and the fast (24 tap) equalizer is adjusted by updating its coefficients.

Figure 7:
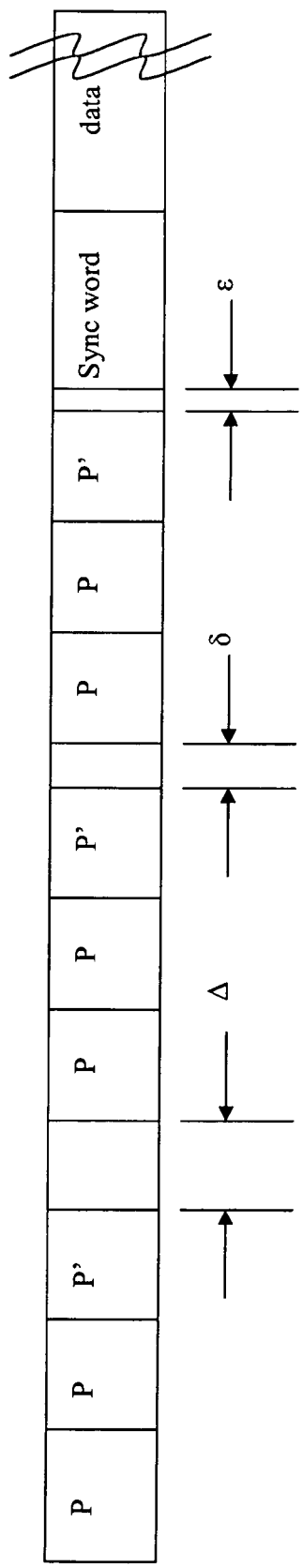
FIG. 7 shows the resulting structure of a frame in accordance with the present invention.

FIG. 7 shows the structure of a resulting frame using the reflection buffer in accordance with the present invention. The pilot is detected a first time in blocks 64 after which the timing correction Δ is inserted, a second time after timing adjustment in blocks 66 after which the timing correction has been reduced to 6 and a third time in blocks 68 preceding the sync word 70 and data stream 72 being received. The timing error has been reduced in the data stream to ε which is nominally smaller than Ts/32. The pilot signal portion is transmitted according to Differential Phase Shift Keying (DPSK) and the sync and data fields are transmitted using Quadrature Amplitude Modulation (QAM).

Although the present invention has been described in considerable detail with reference to certain preferred versions thereof, other versions are possible. Therefore, the spirit and scope of the invention should not be limited to the description of the preferred versions contained herein. Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for recovering symbol synchronization for a serial transmission, the method comprising the steps of:
   obtaining in-phase and quadrature components of a received digital bitstream, the components including a pilot bitstream embedded therein;
   storing a copy of the obtained in-phase and quadrature components in a buffer;
   recovering a version of the pilot bitstream from the obtained components;
   digitally filtering a received digital bitstream with the spectrum of a pre-determined pilot signal to recover the in-phase component;
   digitally filtering the quadrature received digital bitstream with the spectrum of the pre-determined pilot signal to recover the quadrature component;
   computing the absolute values of the in-phase and the quadrature-phase components and forming a sum thereof, the sum being a correlator output;
   comparing the correlator output to a predefined threshold, and upon favorable comparison, the pilot is considered as detected;
   applying the timing correction factor to the stored copy of the received components to adjust the symbol timing of the received bitstream; and
   recovering another version of the pilot bitstream from the copy of the received bitstreams in the buffer based on the adjusted symbol timing.

2. A method for recovering symbol synchronization as recited in claim 1, wherein the step of computing a correlator output includes processing the data through an equalizer which is trained by the output of the correlator to assist in the detection of the pilot signal and recover the timing.

3. A method for recovery symbol synchronization as defined in claim 1 wherein the pilot signal comprises at least one first bitstream and a second bitstream the second bitstream substantially a mirror image of the first bitstream.

4. A method for recovery symbol synchronization as defined in claim 3 wherein the pilot is a waveform having a pattern for a first polarity of four high values in the first four symbols, three low values in the subsequent three symbols, two high values in the next subsequent symbols, and alternating low and high values in seven symbols followed by a mirror image pattern for a first polarity of alternating low and high values in seven symbols followed by two high values in the next subsequent symbols, three low values in the subsequent three symbols and four high values in the final four symbols.

5. A fast symbol timing recovery system comprising:
   means for receiving a broadband signal input including a pilot bitstream;
   means for demodulating and adjusting gain connected to the receiving means and providing as an output in-phase and quadrature components of the signal input;
   a buffer for storing the in-phase and quadrature components;
   means for recovering the pilot bitstream from the components stored in the buffer;
   a correlator for computing a timing correction factor to the stored copy of the received components based on the pilot bitstream to adjust the symbol timing of the received bitstream, the correction factor applied to the recovering means for subsequent reading of the components stored in the buffer, wherein the correlator includes means for digitally filtering a received digital bitstream with the spectrum of the pre-determined pilot signal to recover the in-phase component;
   means for digitally filtering the quadrature received digital bitstream with the spectrum of the pre-determined pilot signal to recover the quadrature component;
   means for computing the absolute values of the in-phase and the quadrature-phase components and forming a sum thereof, the sum being the correlator output; and
   means for comparing the correlator output to a predefined threshold, and upon favorable comparison, providing a pilot detected signal.

6. A fast symbol timing recovery system as defined in claim 5 wherein the pilot bitstream comprises at least one first bitstream and a second bitstream the second bitstream substantially a mirror image of the first bitstream.

7. A fast symbol timing recovery system as defined in claim 6 wherein the pilot is a waveform having a pattern for a first polarity of four high values in the first four symbols, three low values in the subsequent three symbols, two high values in the next subsequent symbols, and alternating low and high values in seven symbols followed by a mirror image pattern for a first polarity of alternating low and high values in seven symbols followed by two high values in the next subsequent symbols, three low values in the subsequent three symbols and four high values in the final four symbols.

* * * * *